United States Patent
Sowul et al.

(10) Patent No.: US 7,331,894 B2
(45) Date of Patent: Feb. 19, 2008

(54) DOG CLUTCH AND METHOD FOR OVERDRIVE

(75) Inventors: Henryk Sowul, Oxford, MI (US); Michael H. Pohl, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 155 days.

(21) Appl. No.: 11/131,562

(22) Filed: May 18, 2005

(65) Prior Publication Data

US 2006/0037830 A1 Feb. 23, 2006

Related U.S. Application Data

(60) Provisional application No. 60/602,849, filed on Aug. 19, 2004.

(51) Int. Cl.
- F16H 3/44 (2006.01)
- F16D 25/061 (2006.01)
- F16D 11/14 (2006.01)
- F16D 63/00 (2006.01)

(52) U.S. Cl. .................. 475/138; 74/411.5; 192/69.91; 475/311

(58) Field of Classification Search ............. 192/69.91, 192/69.41, 221.1; 475/311, 140, 149, 314, 475/138
See application file for complete search history.

(56) References Cited

U.S. PATENT DOCUMENTS

| | | | | |
|---|---|---|---|---|
| 2,399,097 A | * | 4/1946 | Carnagua | 475/140 |
| 2,791,130 A | * | 5/1957 | Boughner | 475/314 |
| 2,815,684 A | * | 12/1957 | Roche | 475/140 |
| 3,382,736 A | | 5/1968 | Abbott | |
| 4,462,274 A | * | 7/1984 | Reppert et al. | 475/302 |
| 4,489,626 A | * | 12/1984 | Lemon | 475/314 |
| 4,817,752 A | * | 4/1989 | Lobo et al. | 192/69.41 |
| 5,044,481 A | * | 9/1991 | Yoshida et al. | 192/69.91 |
| 5,267,915 A | * | 12/1993 | Estabrook | 192/69.91 |
| 5,695,030 A | * | 12/1997 | Medcalf, Jr. | 74/411.5 |
| 5,890,988 A | * | 4/1999 | Kasuya et al. | 192/69.9 |
| 6,213,909 B1 | | 4/2001 | Raghavan | 475/282 |
| 6,250,446 B1 | * | 6/2001 | Leite | 192/69.91 |
| 6,716,129 B2 | | 4/2004 | Bott et al. | 475/210 |
| 6,830,142 B2 | * | 12/2004 | Weilant | 192/69.91 |
| 2003/0125150 A1 | * | 7/2003 | Tanzer | 475/150 |

* cited by examiner

Primary Examiner—Rodney H. Bonck

(57) ABSTRACT

A hydraulically-actuatable clutch and method is operable as an overdrive clutch in a transmission system having a transmission main shaft portion. The clutch is engageable between a transmission housing and a sun gear and rotor hub to provide for grounding of the sun gear and rotor hub to the transmission housing. The clutch may either be engaged or disengaged from the transmission housing. The clutch does not allow the rotor and sun gear to rotatably slip with respect to the transmission housing when the clutch is engaged to ground the rotor and sun gear to the transmission housing. When the clutch is disengaged, the rotor and sun gear may rotate with the transmission main shaft portion.

15 Claims, 2 Drawing Sheets

DOG CLUTCH AND METHOD FOR OVERDRIVE

CROSS REFERENCE TO RELATED APPLICATIONS

This application claims the benefit of U.S. Provisional Application No. 60/602,849 filed Aug. 19, 2004, which is hereby incorporated by reference in its entirety.

TECHNICAL FIELD

A clutch operable as an overdrive clutch in a transmission system is provided.

BACKGROUND OF THE INVENTION

The transmission of power in an electromechanical transmission is described in commonly assigned U.S. Provisional Application Ser. No. 60/590,427, Holmes et al., entitled "Electrically Variable Transmission with Selective Fixed Ratio Operation," filed Jul. 22, 2004, and hereby incorporated by reference in its entirety.

A dog clutch is a mechanical clutch that provides a solid lock when engaged and does not allow for any slipping. Thus, a dog clutch only has two positions: engaged and disengaged. Dog clutches are known to be used in vehicle transmission systems. For example, a dog clutch in a continuously variable transmission is described in commonly assigned U.S. Pat. No. 6,716,129 B2 entitled "Transmission Decoupling Device," issued to Bott et al. on Apr. 6, 2004.

SUMMARY OF THE INVENTION

An electric motor, which is an electrical power unit for purposes of an electrically-variable transmission (EVT), is comprised of a rotor and a stator. By way of example, the stator of an electric motor may be rigidly mounted to the transmission housing and the rotor may be rigidly affixed to a sun gear, which may rotate about the transmission main shaft. When an engine is propelling an EVT vehicle, it may be desirable to lock up the sun gear to utilize discrete gear ratios. Thus, it is an object of the present invention to introduce a small and simple clutch that may ground a rotor hub and associated sun gear to a fixed body in a transmission, such as the transmission housing.

A hydraulically-actuatable clutch adapted for use in an EVT is provided. The clutch of the present invention may be utilized to ground the rotor and sun gear to the transmission housing in an EVT. The clutch has a piston which is always splined to the sun gear and the rotor hub and which is engageable with the transmission housing. At any time the piston may either be engaged with or disengaged from the transmission housing. When engaged, the clutch grounds the rotor and sun gear to the transmission housing such that the rotor and sun gear may not rotatably slip with respect to the transmission housing. When disengaged, the rotor and sun gear may rotate about the transmission main shaft, which may include or may be connected to the input member of the hybrid transmission.

Preferably, the clutch of the present invention is a dog clutch comprising a spring-loaded piston slidably located in a clutch cavity in a transmission system. The clutch cavity has an inlet connected to an oil passage to provide for hydraulic operation of the piston. A spring may force the piston to slide or shuttle in a first direction to engage or interconnect the transmission housing to a sun gear, which is affixed to the rotor hub. To disengage the piston, and release the rotor and sun gear, from the transmission housing, oil may be pumped through the oil passage into the clutch cavity through a cavity inlet, thereby forcing the piston to axially slide against the spring load and cause the piston to disengage from the transmission housing while remaining engaged with the sun gear. When the fluid pressure has substantially decreased, the spring load forces the piston back in the first direction to re-engage the transmission housing to re-ground the sun gear and rotor.

The present invention also encompasses a method of engaging and disengaging a rotatable member, such as a rotor or sun gear, with a fixed member, such as a transmission housing or cover. The method comprises forming splines in cavity portions of the fixed and rotatable members and shuttling a splined piston between the cavity portions. When shuttled in one direction, the piston locks the rotatable member to the fixed member and when the piston is shuttled in the opposite direction, the rotatable member is free to rotate with respect to the fixed member. A spring may shuttle the piston to lock the rotatable member to the fixed member and a hydraulic force may shuttle the piston to disengage the rotatable member from the fixed member.

The dog clutch of the present invention may be smaller than prior electrically variable transmission friction clutches that rotatably locked the sun gear and rotor to the transmission housing or cover. Additionally, the mechanics of the dog clutch of the present invention may be simpler than previously utilized friction clutches. Further, the hydraulic control utilized to actuate the dog clutch of this invention may potentially be simpler than a friction clutch for grounding the rotor, if controlled electrically, as by a solenoid.

A clutch adapted for engagement in a transmission having a fixed housing at least partially covering an electric power unit having a rotatable hub and sun gear is provided. The clutch comprises a clutch cavity defined by the fixed housing and sun gear. The clutch cavity has a fluid inlet and a spring. The clutch also comprises a piston, which is slidably movable within the clutch cavity. The piston is in fluid flow communication with the fluid inlet for causing movement in one direction and in biased relationship with the spring for causing movement in the opposite direction. The clutch also comprises a plurality of first splines on the fixed housing, a plurality of second splines on the sun gear, and a plurality of third splines on the piston. The plurality of third splines are movable with the piston for engaging with the plurality of second splines and not with the plurality of first splines when the piston has moved in one direction. The plurality of third splines are also movable with the piston for engaging with both of the plurality of first splines and plurality of second splines when the piston has moved in the opposite direction. The spring biases the piston to engage the fixed housing with the sun gear when fluid pressure at the fluid inlet is insufficient to compress the spring. Sufficient fluid pressure at the fluid inlet forces the piston to disengage the sun gear from the fixed housing. When fluid pressure is decreased in the clutch cavity, the spring forces the piston to reengage the sun gear with the fixed housing.

A clutch adapted for a transmission having a rotatable sun gear and a fixed housing is provided. The clutch comprises a spring biasable, fluid-actuatable, relatively engageable and disengageable link between the fixed housing and the rotatable sun gear for engaging and disengaging the clutch. The link grounds the sun gear to the transmission housing when the clutch is engaged.

A method for engaging and disengaging a rotatable member with a fixed member in a transmission housing is provided. The method comprises forming a first splined cavity portion in the fixed member, forming a second splined cavity portion in the rotatable member separate from the first splined cavity portion, and shuttling a splined piston between the cavity portions. The splined piston is shuttled in one direction to engage the fixed and rotatable members and in another direction to disengage the fixed and rotatable members.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
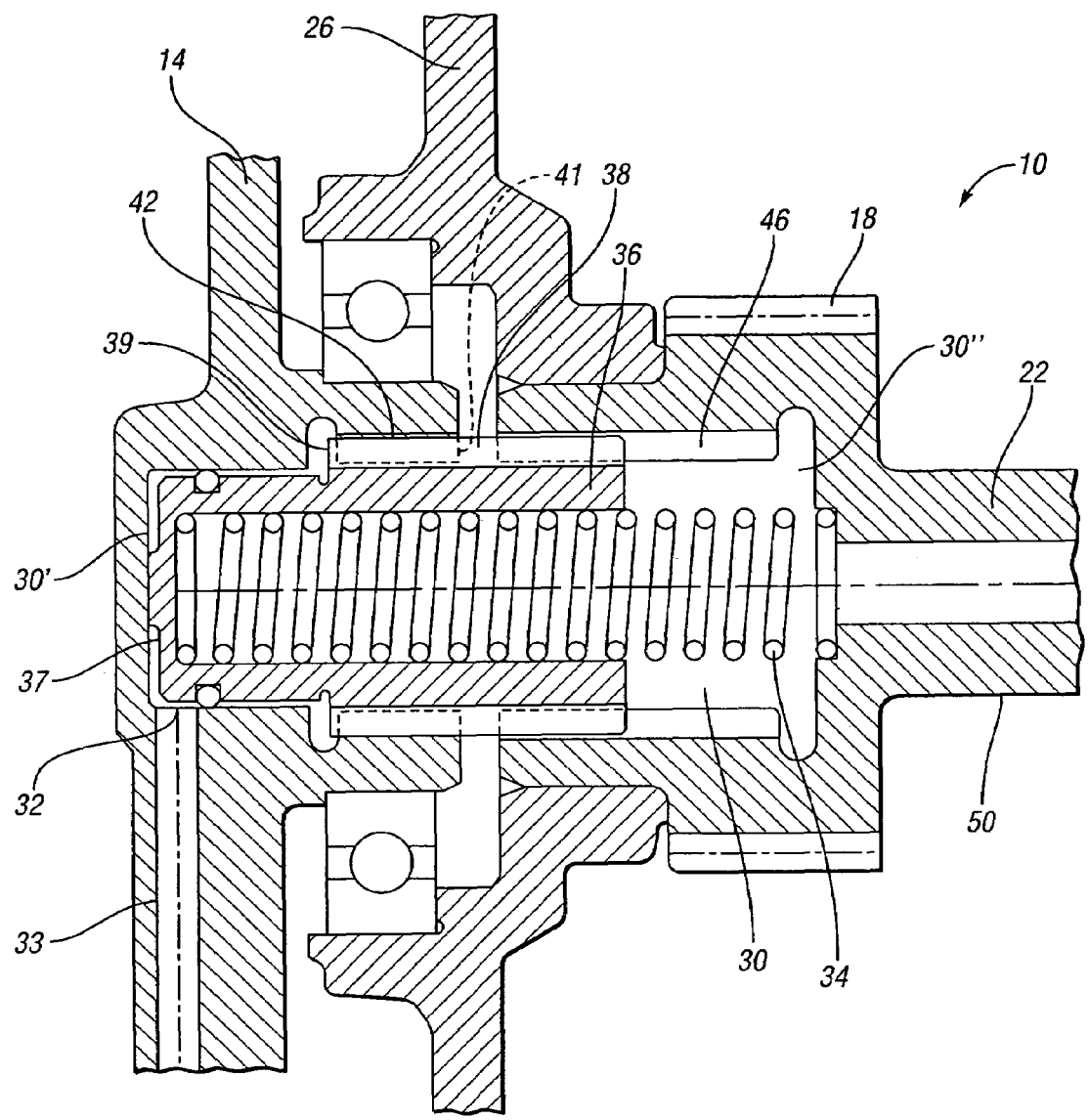
FIG. 1 is a fragmentary cross-sectional view of the clutch of the present invention.
Figure 2:
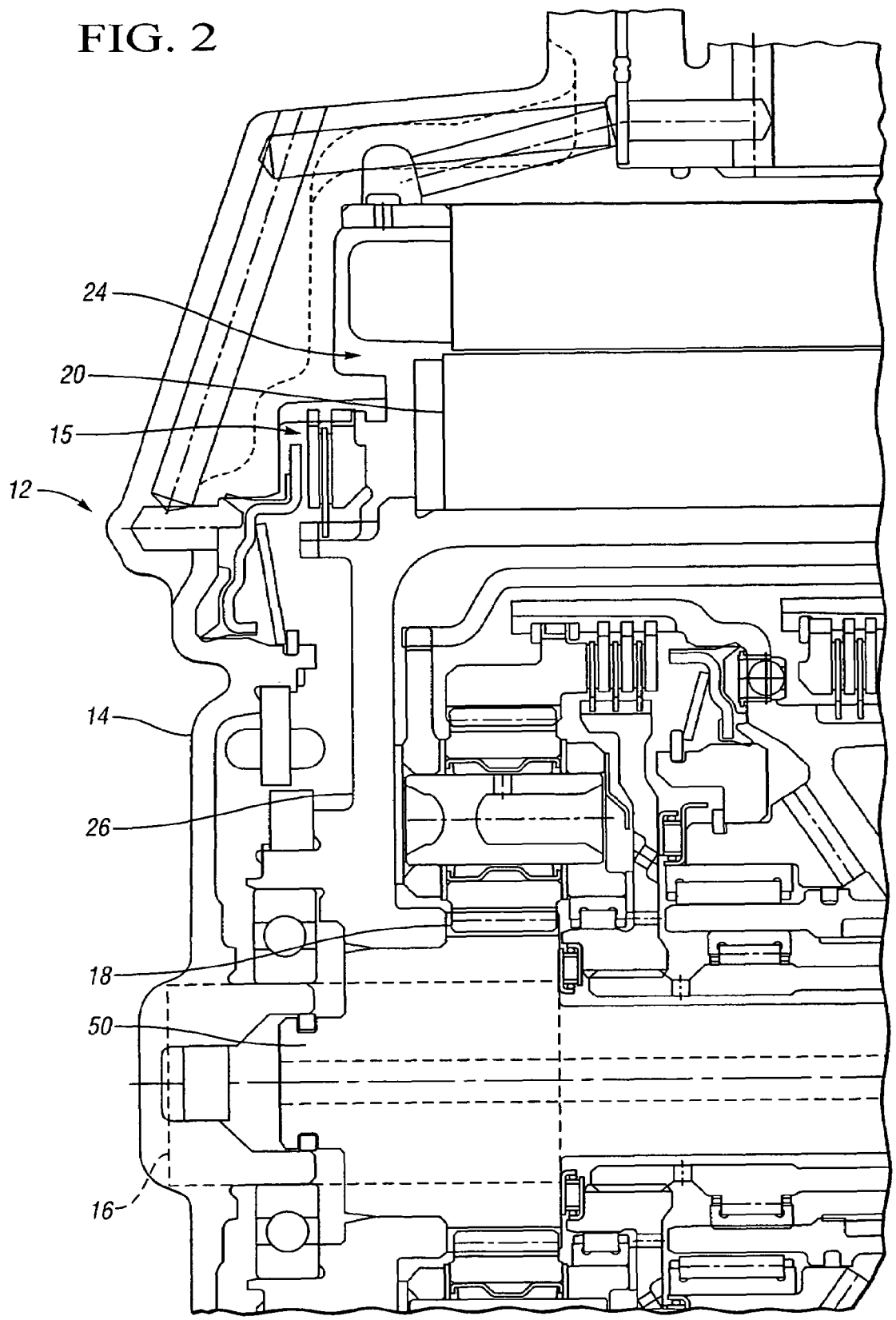
FIG. 2 is a fragmentary cross-sectional view of an electrically-variable transmission (EVT), having a friction clutch, which is relocated by the present invention to a location shown in phantom axially aligned with the transmission main shaft portion.

FIG. 1 shows a clutch 10 in accordance with the present invention for use in combination with and modification of an electrically-variable transmission (EVT) 12, as partially illustrated in FIG. 2. The clutch 10, which may be a dog clutch, operates between a transmission housing 14 (which may be the actual transmission housing or a transmission cover) and a sun gear 18 on a sun gear shaft 22. The sun gear 18 is attached or affixed to a rotor hub 26 which supports a rotor 20 in an electrical power unit 24, as shown in FIG. 2. The brake clutch 15 illustrated in FIG. 2 is the clutch that has been improved and relocated to the area 16 by the present invention.

The clutch 10 components are partially located within a clutch cavity 30. The clutch cavity 30 is defined by the transmission housing 14 at one end and the sun gear 18 or sun gear shaft 22 at the other end. The clutch cavity 30 may be defined by a first clutch cavity portion 30' and a second clutch cavity portion 30", these two portions being separated by a piston 36. An inlet 32 to the clutch cavity 30, connected to an oil passage 33, is located in the transmission housing 14. The piston 36 is slidably located in the clutch cavity 30 such that the piston 36 may axially slide relative to the transmission housing 14 and the sun gear 18. Within the clutch cavity 30, the piston 36 is in biased relationship with a spring 34 for movement in a first direction and in fluid flow communication with the inlet 32 for movement in a second direction, opposite the first direction. This fluid may be pressurized oil that is located at the inlet 32.

Transmission housing splines 42 and sun gear splines 46 are formed on the transmission housing 14 and sun gear 18 (or sun gear shaft 22), respectively. Piston splines 38 are located on the piston 36 externally and are movable therewith for engaging the sun gear splines 46 and for engaging and disengaging the transmission housing splines 42. The piston splines 38 and the transmission housing splines 42 may be chamfered at 39, 41 where they oppose each other during the re-engagement to provide for easier re-engagement.

When the spring 34 has forced the piston 36 to slide within the clutch cavity 30 to the left, as viewed in FIG. 1, the piston splines 38 are engaged with the transmission housing splines 42 and sun gear splines 46, thus grounding the sun gear 18 and rotor hub 26 to the transmission housing 14. When the sun gear 18 and rotor hub 26 are grounded to the transmission housing 14, the transmission is in "overdrive range." The piston 36 is located to the left of the clutch cavity 30, as viewed in FIG. 1, when there is insufficient fluid pressure at the inlet 32 to compress the spring 34. When the fluid pressure increases at the inlet 32 and fluid flow communication through the inlet 32 has compressed the spring 34 and forced the piston 36 to slide within the clutch cavity 30 to the right, as viewed in FIG. 1, the piston splines 38 remain engaged with the sun gear splines 46 but are disengaged from the transmission housing splines 42. Sufficient fluid pressure is that which compresses the spring 34. When the piston splines 38 are disengaged from the transmission housing splines 42, the sun gear 18 and rotor hub 26 may rotate with the transmission main shaft portion 50, as shown in FIG. 2, which may be connected to an input shaft portion of the hybrid transmission. The input shaft portion is not shown here but is shown and described in commonly-assigned co-pending U.S. Provisional Ser. No. 60/602,976, filed Aug. 19, 2004, entitled "Main Shaft Dog Clutch," to Diemer, Burgman and Sowul, which is incorporated herein. Pressurized fluid at the inlet 32 may enter the first clutch cavity portion 30', forcing the piston 36 against the spring bias, which increases the volume of the first clutch cavity portion 30' and thereby decreases the volume of the second clutch cavity portion 30".

The present invention also comprises a clutch 10 having a spring 34 biasable, fluid-actuatable link 37 that is engageable and disengageable between the fixed transmission housing 14 and the rotatable sun gear 18. When the clutch 10 is engaged, the link 37 grounds the sun gear 18 to the transmission housing 14.

The improved EVT 12 is also embodied in a method for engaging and disengaging a rotatable member, such as a rotor hub 26, sun gear 18, or sun gear shaft 22 with a fixed member, such as a transmission housing 14. The method comprises forming a first splined portion 42 in the cavity 30, 30' of the fixed member 14, and forming a second splined portion 46 in the cavity 30, 30" of the rotatable member 26, 18, 22. Next, a splined piston 36 is shuttled back and forth within the cavity 30. The piston splines 38 are adapted to be engageable with the fixed member splines 42 and the rotatable member splines 46. When the piston 36 has slid to the left, as viewed in FIG. 1, the rotatable member 26, 18, 22 is engaged with the fixed member 14. When the piston 36 has slid to the right, as viewed in FIG. 1, the rotatable member 18, 22, 26 is disengaged from the fixed member 14. The piston 36 may be shuttled by hydraulic force or by a spring 34.

While the best modes for carrying out the invention have been described in detail, those familiar with the art to which this invention relates will recognize various alternative designs and embodiments for practicing the invention within the scope of the appended claims.

The invention claimed is:

1. A clutch adapted for engagement in a transmission having a fixed housing at least partially covering an electric power unit having a rotatable hub and sun gear, said clutch comprising:

a clutch cavity defined by said fixed housing and said sun gear and having a fluid inlet and a spring;

a piston slidably movable within said clutch cavity, said piston being in fluid flow communication with said fluid inlet for causing movement in one direction and in biased relationship with said spring for causing movement in the opposite direction;

a plurality of first splines on said fixed housing and a plurality of second splines on said sun gear;

a plurality of third splines on said piston for engaging with said plurality of second splines and not with said plurality of first splines when said piston has moved in said one direction and for engaging with both of said plurality of first splines and said plurality of second splines when said piston has moved in said opposite direction;

wherein said spring biases said piston to engage the fixed housing with the sun gear when fluid pressure at said fluid inlet is insufficient to compress said spring;

wherein sufficient fluid pressure at said fluid inlet forces said piston to disengage the sun gear from the fixed housing; and wherein when fluid pressure is decreased in said clutch cavity, said spring forces said piston to reengage the sun gear with the fixed housing.

2. The clutch of claim 1 wherein the plurality of first splines and the plurality of third splines are chamfered where they oppose each other during movement in said opposite direction.

3. The clutch of claim 1 wherein the clutch is a dog clutch.

4. A clutch adapted for a transmission having a rotatable sun gear and a fixed housing, said clutch comprising:

a cylindrical clutch cavity defined by the fixed housing and the sun gear;

a first plurality of longitudinal splines disposed circumferentially about the inner periphery of said clutch cavity defined by the sun gear;

a second plurality of longitudinal splines disposed circumferentially about the inner periphery of said clutch cavity defined by the fixed housing;

a relatively engagable and disengagable link axially translatable within said cylindrical clutch cavity for engaging and disengaging said first plurality of longitudinal splines with said second plurality of longitudinal splines of the clutch; and a third plurality of longitudinal splines disposed circumferentially about the outer periphery of said link configured for engaging and disengaging said first plurality of longitudinal splines with said second plurality of longitudinal splines.

5. The clutch of claim 4 wherein the clutch is a dog clutch.

6. The clutch of claim 4, wherein said third plurality of longitudinal splines is continuously engaged with said first plurality of longitudinal splines and selectively engageable with said second plurality of longitudinal splines.

7. The clutch of claim 6, further comprising:

a spring member disposed within said cavity and operatively engaged with said link to thereby bias said link to engage said first plurality of longitudinal splines with said second plurality of longitudinal splines via said third plurality of longitudinal splines.

8. The clutch of claim 7, wherein said fixed housing further defines a fluid passageway in fluid flow communication with said cylindrical clutch cavity via a fluid inlet, and wherein sufficient fluid pressure at said fluid inlet forces said link to disengage said first plurality of longitudinal splines from said second plurality of longitudinal splines.

9. A method for engaging and disengaging a rotatable member with a permanently fixed member in a transmission housing comprising:

forming a first splined cavity portion in said permanently fixed member;

forming a second splined cavity portion in said rotatable member separate from said first splined cavity portion; and shuttling a splined piston between said cavity portions in one direction to engage said permanently fixed and rotatable members and in another direction to disengage said permanently fixed and rotatable members.

10. The method of claim 9 wherein the shuttling to engage is spring biased.

11. The method of claim 9 wherein the shuttling to disengage is fluid pressure biased.

12. A clutch adapted for a transmission having a rotatable sun gear and a fixed housing, said clutch comprising:

a cylindrical clutch cavity defined by the fixed housing and the sun gear;

a first plurality of longitudinal splines disposed circumferentially about the inner periphery of said clutch cavity defined by the sun gear;

a second plurality of longitudinal splines disposed circumferentially about the inner periphery of said clutch cavity defined by the fixed housing;

a spring biased, fluid-actuated, relatively engagable and disengagable link axially translatable within said cylindrical clutch cavity for engaging and disengaging said first plurality of longitudinal splines with said second plurality of longitudinal splines of the clutch; and a third plurality of longitudinal splines disposed circumferentially about the outer periphery of said link configured for mechanically engaging and disengaging said first plurality of longitudinal splines with said second plurality of longitudinal splines;

wherein said link grounds the sun gear to the transmission housing when said first plurality of longitudinal splines are engaged with said second plurality of longitudinal splines.

13. The clutch of claim 12, wherein said third plurality of longitudinal splines is continuously engaged with said first plurality of longitudinal splines and selectively engageable with said second plurality of longitudinal splines.

14. The clutch of claim 13, further comprising:

a spring member disposed within said cavity and operatively engaged with said link to thereby bias said link to engage said first plurality of longitudinal splines with said second plurality of longitudinal splines via said third plurality of longitudinal splines.

15. The clutch of claim 14, wherein said fixed housing further defines a fluid passageway in fluid flow communication with said cylindrical clutch cavity via a fluid inlet, and wherein sufficient fluid pressure at said fluid inlet forces said link to disengage said first plurality of longitudinal splines from said second plurality of longitudinal splines.

* * * * *